Feb. 13, 1962 W. J. TOULIS 3,021,504
APPARATUS FOR CONTROLLING THE EFFECTIVE
COMPRESSIBILITY OF A LIQUID
Filed July 2, 1956 9 Sheets-Sheet 1
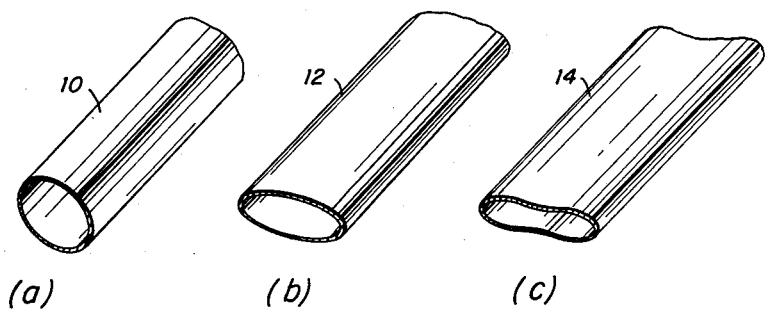
Fig. 1
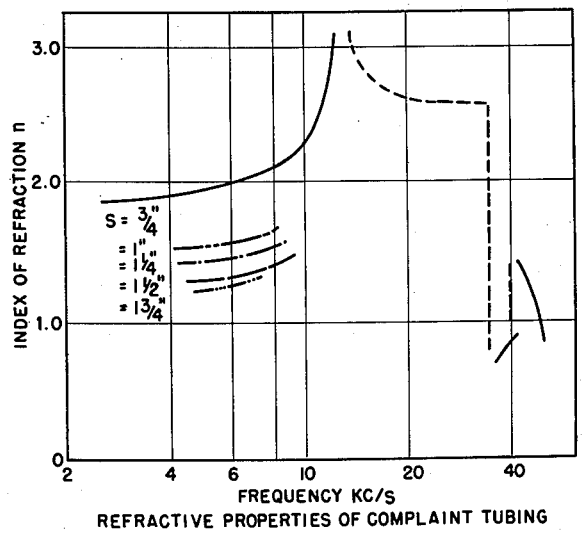
Fig. 2
REFRACTIVE PROPERTIES OF COMPLAINT TUBING
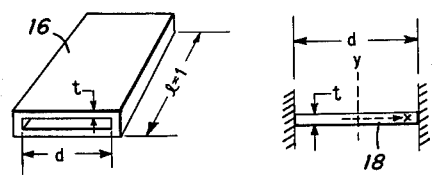
Fig 4a  Fig. 4b
INVENTOR.
WILLIAM J. TOULIS
BY
George E. Pearson
ATTORNEYS INVENTOR.
WILLIAM J. TOULIS
BY
George E. Pearson
ATTORNEYS Feb. 13, 1962 W. J. TOULIS 3,021,504
APPARATUS FOR CONTROLLING THE EFFECTIVE
COMPRESSIBILITY OF A LIQUID
Filed July 2, 1956 9 Sheets-Sheet 3

INVENTOR.
WILLIAM J. TOULIS
BY
George E. Pearson
ATTORNEYS

Fig. 8b
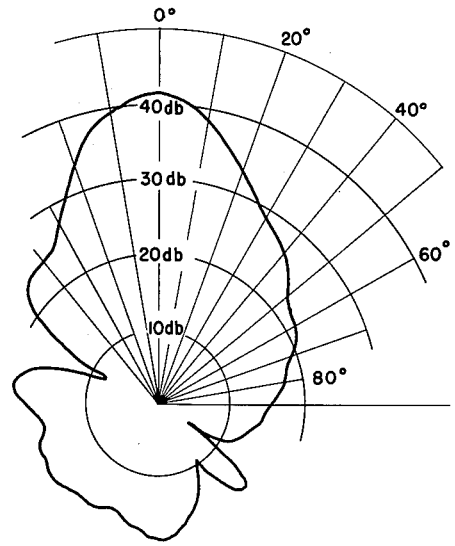
2.0 KC/S
Fig. 8c
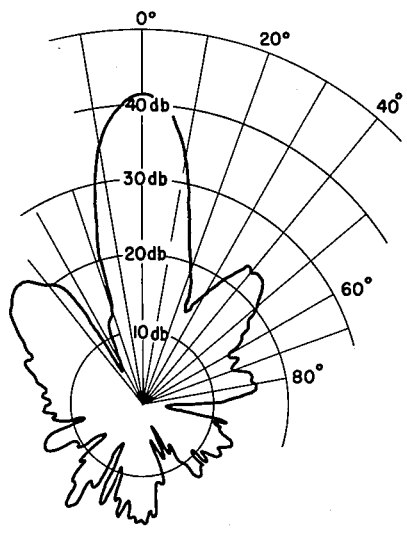
4.0 KC/S
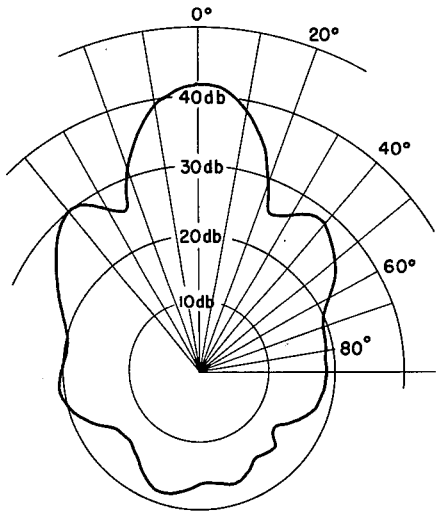
2 KC/S
Fig. 7b
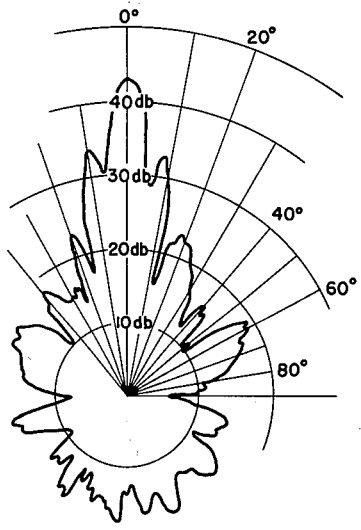
8.0 KC/S
Fig. 8d
INVENTOR.
WILLIAM J. TOULIS
BY
*George E. Pearson*
ATTORNEY 7.5 KC/S

12 KC/S

INVENTOR.
WILLIAM J. TOULIS
BY
George E. Pearson
ATTORNEYS

Feb. 13, 1962 W. J. TOULIS 3,021,504
APPARATUS FOR CONTROLLING THE EFFECTIVE
COMPRESSIBILITY OF A LIQUID
Filed July 2, 1956 9 Sheets-Sheet 7

30 KC/S

15 KC/S

INVENTOR.
WILLIAM J. TOULIS
BY
George E. Pearson
ATTORNEY

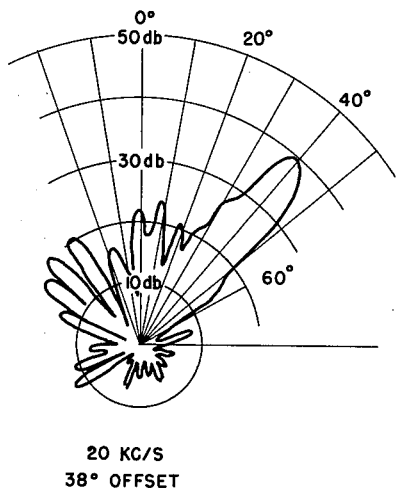
20 KC/S
38° OFFSET
Fig. 10d
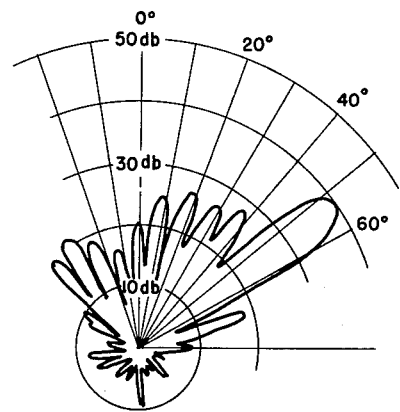
20 KC/S
54° OFFSET
Fig. 10e
Fig. 11
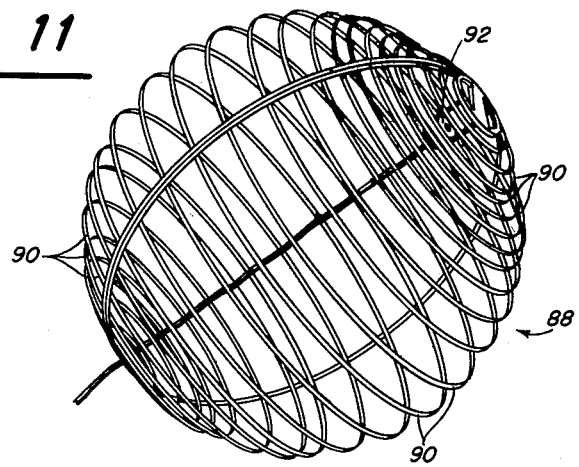

Feb. 13, 1962 W. J. TOULIS 3,021,504
APPARATUS FOR CONTROLLING THE EFFECTIVE
COMPRESSIBILITY OF A LIQUID
Filed July 2, 1956 9 Sheets-Sheet 9
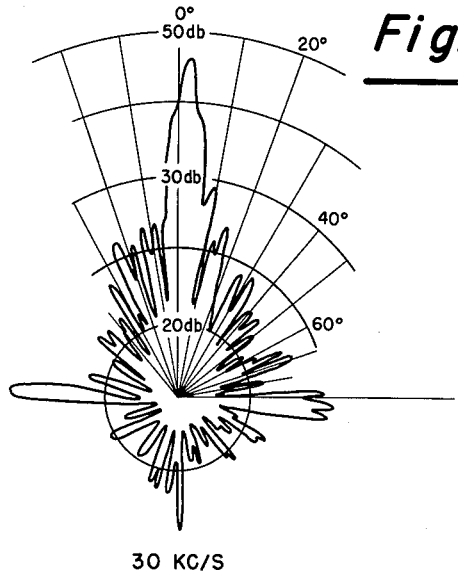
Fig. 9d
30 KC/S
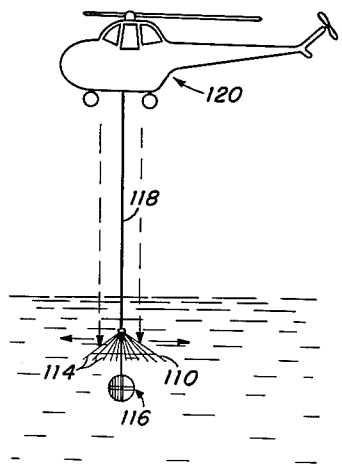
Fig. 14
Fig. 15a
Fig. 15b
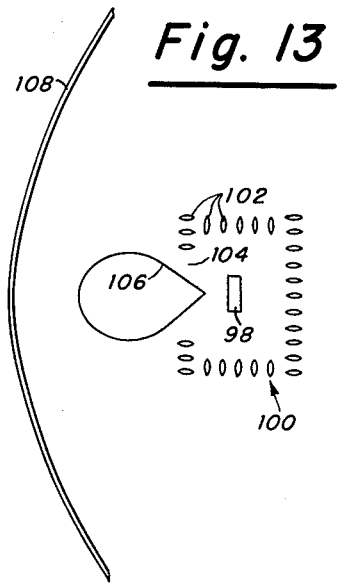
Fig. 13
INVENTOR.
WILLIAM J. TOULIS
BY
George E. Pearson
ATTORNEYS

United States Patent Office 3,021,504
Patented Feb. 13, 1962

3,021,504
APPARATUS FOR CONTROLLING THE EFFECTIVE COMPRESSIBILITY OF A LIQUID
William J. Toulis, 2324 Palermo Drive,
San Diego, Calif.
Filed July 2, 1956, Ser. No. 595,563
18 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This invention relates to methods and apparatus for controlling the velocity of propagation of vibrational energy in a liquid having a bulk modulus which may be substantially greater than its shear modulus and more particularly to a method and apparatus for substantially increasing the compressibility of a liquid in predetermined portions thereof, in order to provide reflection and refraction of the propagated energy.

As wave energy which is propagated through a medium having one velocity of propagation enters a medium having a different velocity of propagation, the direction of propagation is changed to effect both reflection and refraction as has long been well known. This is the basic principle of operation of known reflectors and lenses. The velocity of propagation of energy through any medium depends upon, among other factors, both the compressibility or bulk modulus of the medium and its density. The many different devices in common use at present for controlling the velocity of propagation of energy, such as sound energy, for example, are all based upon the use of a continuous reflecting or refracting medium which provides either the desired impedance discontinuity for reflection or the desired velocity change for refraction. Actually there have previously existed no methods for changing the velocity of sound in a liquid itself in any practical sense. Lenses, for example, require unusual liquids or solids for the desired configuration. Reflectors have been made out of thick sheet metal or sheet rubber having air cells confined therein. Since these structures all utilize continuous sheets for lens configuration, they are bulky and difficult to drag through water, particularly when used at lower frequencies where increased size is necessary. At high frequencies, the bulk of such structure is not significantly unwieldy since small size is satisfactory. But at the lower frequency, such structures must be dimensionally large making them quite unmaneuverable or requiring extensive electronic control as a substitute for physical movement thereof. Moreover, pressure release material, such as sheets of air filled rubber, loses its effectiveness under high hydrostatic pressures and long immersion.

In the case of a gaseous medium, mechanical schemes for changing bulk modulus or compressibility, are impractical in view of the enormous differences in compressibility, while it will be seen that such methods are more reasonable in liquid media. Gaseous bubbles could drastically increase the compressibility of the liquid but in practice they are difficult to control, have a resonant frequency which in most cases is too low, and have a compressibility which varies with pressure or depth at sea. The enclosing of bubbles in cavities, such as in air filled rubber or rubber tube, introduces additional attenuation which may be quite serious and undesirable particularly in the cases of lenses. Metallic and plastic thin shelled balls and cylindrical tubes have a rigidity which is too great to afford the required compressibility unless they are very thin.

In the method of the present invention, the effective compressibility and therefore the bulk modulus and velocity of propagation of sound in a liquid, is controlled by mixing with the propagating medium a volume of matter having a substantially large compressibility. In order to increase the resilience of the matter of great compressibility, it is preferably formed in a non-circular configuration. A preferred means for achieving this result is a thin walled resilient tube which has been deformed or flattened and has the ends thereof sealed to prevent flooding and thereby maintain sound pressure differential. An alternative device, having a more limited pressure range, may be a strip of commercially available air filled rubber having a plurality of sealed air cells therein. An array of such strips or tubes having a spacing between adjacent elements which is determined in accordance with the amount of reflection and refraction desired, and also in accordance with the desired frequency range of operation, is formed in a geometrical configuration which will yield the desired proportion and distribution of reflection and refraction of incident energy. This configuration may be in the form to provide refractive focusing as in a lens or to provide reflective focusing as in a reflector. The array of strips or tubes may also be arranged in a configuration which will provide a pressure release surface in the design of transducers, isolation or shielding of acoustic energy, radiation of which is not desired, and soft walled resonators which may be utilized for improving the efficiency of energy transfer or for measurement of attenuation constant and velocity of propagation.

It is an object of this invention to control the velocity of wave propagation.

A further object of this invention is the increase in the effective compressibility of a liquid.

Still another object of this invention is the increase of compressibility of a liquid by an amount which is substantially constant over a wide range of hydrostatic pressure.

A further object of this invention is the reduction of mass and drag of lenses and reflectors.

Still another object of this invention is the improvement of lenses and reflectors.

A further object of this invention is to control the index of refraction at predetermined points of a liquid by controlling the effective compressibility thereof to thereby control the direction of propagation of energy in said liquid.

Still another object of this invention is the formation of directional beams of vibrational wave energy at low frequencies.

Other objects and many of the attendant advantages of this invention will be readily appreciated as the same becomes better understood by reference to the following detailed description when considered in connection with the accompanying drawings wherein:

FIG. 1 illustrates the compliant tubing of this invention and its formation;

FIG. 2 illustrates the variation of the index of refraction with frequency of a three dimensional array of compliant tubing with various spacing;

FIGS. 4a and 4b show mathematical equivalents of an individual compliant tube of the type shown in FIG. 1;

FIG. 11 illustrates a spherical focusing shell;

FIG. 13 illustrates a free flooding resonant soft walled chamber at the focus of a parabola for providing improved coupling or better impedance match between a transducer and the surrounding medium;

FIG. 14 illustrates the use of this invention for shielding a helicopter carried dipping sonar; and FIGS. 15a and 15b illustrate two arrangements of compliant tubing for providing thin lenses.

A preferred form of compliant element which may be utilized in this invention comprises a thin walled metallic tube 10 of, for example, 3S–H14, half hard aluminum, ⅜ of an inch outside diameter and of .028 inch wall thickness which is flattened or deformed to provide a compliant tube 12 of elliptical or oblong cross section or to provide a compliant tube 14 having the cross section of a flattened figure eight. The ends of tubes 12 or 14 are sealed as by soldering or welding or the like, with a gas such as air under normal atmospheric pressure therein. It is the resilience of the deformed tube wall itself which provides the major portion of increased compressibility. In order to obtain the benefit of such resilience, it is necessary that different magnitudes of compressional wave energy or sound, a differential energy pressure, be applied to opposite sides (outside and inside) of the tube wall. Therefore it is necessary that the main energy propagating medium, such as water, be caused to have vibrational contact with one side of the wall which is less than the vibrational contact of the medium with the other side thereof or, as is preferred, the propagating medium is allowed to contact one side only (the outside) of the wall by the sealing of the tube ends. The matter confined within the sealed tube is of relatively small importance as long as its compressibility is great enough to allow vibration of the tube walls. The tubes may be vacuum sealed although it is most convenient to seal the tubes with air contained therein. The mixture with a fluid such as water, of one of these tubes or an array of such tubes, will markedly alter the velocity of sound by virtue of the greatly increased compliance afforded by the tubing which effectively increases the compressibility of a liquid in which it is immersed. Tubing in this form is similar in behavior to a circular plate clamped at the edges but avoids the necessity for extensive compartmentalization and irregularities in the outer surface. This type of tubing is herein defined as compliant tubing because it is used to alter the compressibility of a liquid. The term compliant strip is used herein to include this compliant tubing and also non-rigid circular tubes and strips or cords of air cell rubber having air bubbles resiliently confined therein.

The compliant tubing is distinguished by a compressibility of constant value at low frequency, a compressibility that is essentially independent of depth at sea or pressure as long as the elastic limit of the material is not exceeded, and a resonance determined by its dimensions and mechanical properties. The conveniently measurable properties of compliant tubing are the index of refraction, defined as the relative reduction of the velocity of sound in water by an array of compliant strips, and the standing wave ratio, defined as the efficiency of reflection by a single layer array of compliant strips.

Figure 3:
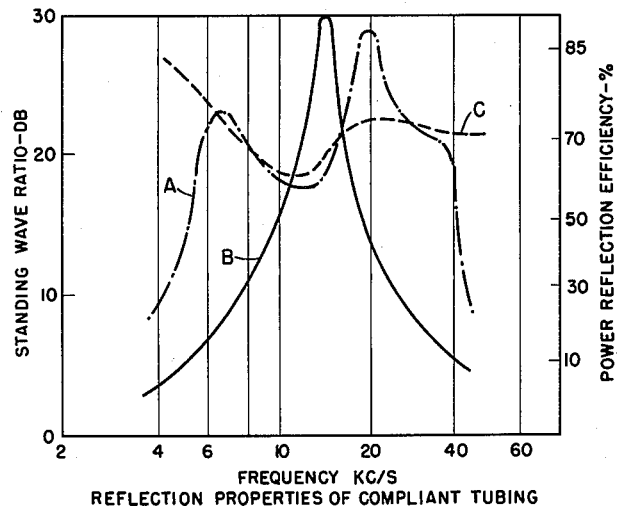
FIG. 3 illustrates the reflection properties of compliant tubing.

FIGS. 2 and 3 illustrate results obtainable with two different methods used for determining basic acoustic properties of compliant tubes, the resonant chamber method and the standing wave ratio method.

The resonance method involves the use of thin walled chambers filled with water and excited either in the fundamental or higher resonant modes. Measurements indicated in FIG. 2 are made with compliant tubing in the form of a three dimensionally uniformly spaced array of tubes located within the chamber. FIG. 2 illustrates the index of refraction of such an array as a function of frequency and spacing, the index of refraction being defined as the factor by which the velocity of sound in water is reduced by the three dimensional array of compliant tubing. The resonant frequencies of the various modes are first determined with the resonator filled with water alone and then determined with the array of tubing in the water. The ratio of the frequencies for a given mode of resonance corresponds to the equivalent index of refraction.

The standing wave ratio method for determining reflection efficiency involves the determination of maximum and minimum pound pressures found in front of a planar reflecting array of spaced compliant tubing when a plane sound wave is normally incident upon the reflector. The resultant power reflection efficiency is determined by the square of the amplitude of the coefficient of reflection which is equal to the ratio of the difference between the maximum and minimum pressures to the sum of maximum and minimum sound pressures. A ¼ inch diameter barium titanate cylindrical transducer may be used to probe the sound pressure field in front of the reflector. FIG. 3 illustrates the standing wave ratio and also the reflection efficiency as a function of frequency for a single layer of uniformly spaced tubing used as a plane reflecting mirror with the edges of the tubing facing the sound source. Two of the curves in FIG. 3, A, B, correspond to spacing between adjacent tubes of ¾ inch and 1½ inches respectively while the third curve, C, corresponds to observations on a sheet of ¼ inch thick air cell rubber, the latter curve being shown for a comparison. It should be noted that the compliant tubing curves have upper frequency limits that correspond approximately to half wave length spacing between tubes. It has been found that the orientation of the flattened tube is not significant except at the higher frequencies, where the width of the tube (thickness of the array) is more nearly comparable to the wave length of the sound in water. The curves of FIG. 3 indicate that the single layer array is effectively a ¼ wave length thick at 14 kilocycles per second for the tube to tube spacing, S=1½ inches. For S=¾ inch, the quarter wave thickness occurs at 7 kilocycles per sound. The reflection peak at about 19 kilocycles per second is characteristic of the compliant tube and the radiation load on it.

The methematical equivalent of the individual compliant tube 12 or 14 of FIG. 1 may be represented as a rectangular tube 16 as in FIG. 4a or more simply as a clamped beam 18 (a strip clamped at both edges) as in FIG. 4b. The latter configuration has been studied extensively in both static and dynamic structures and therefore its properties have been established fairly well.

The most distinctive property of the compliant tubing, as shown by the curves of FIG. 2, is its resonant frequency at 12 kc./s. In terms of the clamped-beam equivalent in FIG. 4b, the lowest resonant frequency, $f_r$, may be expressed in a form that includes the radiation loading of the medium as $$f_r = 1.028 \frac{t}{d^2} \sqrt{\frac{E}{\rho_e}} \qquad (1)$$

where $t$ = wall thickness of tube or strip;
$d$ = inside width of compliant tube or strip;
$E$ = Young's modulus of tube material;
$\rho_e = (1+\beta)$ is the effective density of the bar or strip and takes into consideration the reactive loading of the enveloping medium;
$\rho$ = density of the tube material;

$$\beta = \frac{3}{4}\left(\frac{1}{2}\right)\frac{\rho_0}{\rho}\frac{d}{t}$$

and
$\rho_0$ = density of the fluid medium.

The resonant frequency of a compliant tube is significant in that it determines, approximately, the range of frequencies over which the tubing may be successfully employed. FIGURE 2 suggests that the lattice of ⅜" tubing provides a substantially uniform index of refraction at all frequencies below 8 kc./s. and nonuniform but higher values up to about 35 kc./s. The static bulk modulus of a mixture involving a liquid and a lattice of compliant tubing (and, therefore, the index of refraction as the frequency approaches zero) may be evaluated by assuming that the compliant tubing may be represented again by a clamped strip. The vertical deflection at any point $x$ on the strip in FIG. 4b due to a change in the vertical pressure by an amount $\Delta p$ may be expressed as $$y = \frac{\Delta p}{24EI}\left[\frac{d^2 x^2}{2} - x^4\right]$$

where I is the moment of inertia of the strip cross-section area about the median plane and defined as $$I = \int_{-t/2}^{t/2} y^2 dy = t^3/12$$

assuming unit length in the $z$ direction. Consequently, the resultant change in volume $\Delta V$ per unit length of the rectangular tubing in FIG. 4b is given by $$\Delta V = 2\int_{-d/2}^{d/2}\Delta y\, dx$$
$$= \frac{7}{240}\frac{d^5}{t^3}\frac{\Delta p}{E} \qquad (2)$$

The resultant bulk modulus M in the mixture is by definition, $$\frac{M_0}{M} = 1 + \left[\frac{M_0}{V_0}\frac{\Delta V}{\Delta p}\right] \qquad (3)$$

where $M_0$ is the bulk modulus of the liquid and $V_0$ is the volume of liquid associated per unit length of the complaint tubing, provided the total volume of the latter is small compared to $V_0$. In the case of a square lattice of tubing $V_0 = S^2$, where S is the tube-to-tube spacing, while for a single layer of tubing it might be more practical to define $V_0 = Sd$ where $d$ again is the inside width of the tubing.

Equations 1 and 2 depend upon both the geometrical and physical properties of the tubing. They may be combined, however, in a form that reveals a somewhat different relationship:

$$f_r^2\left(\frac{\Delta V}{\Delta p}\right) = \frac{110.}{\rho_0\left[1 + \frac{8}{3}\frac{\rho}{\rho_0}\frac{t}{d}\right]} \qquad (4)$$

that is, if either $f_r$ or $\Delta V$ is selected first, then the value of the other factor is automatically fixed and independent of the properties of the compliant tube as long as the walls are relatively thin and the density of the material is low or comparable to that of the surrounding medium.

The implication in Equation 4 that walls must be very thin for optimum results is not entirely justifiable if operation at great ocean depths is to be practical. Excessive hydrostatic pressure will create stresses that cause nonlinear deflections and buckling. If it is assumed that the intensity of stress, T, is maximum at the center of the compliant tube beam equivalent instead of at the edge as in the true clamped beam, then $$T = \frac{P_0}{4}\left(\frac{d}{t}\right)^2 \qquad (5\text{a})$$

where $P_0$ is the net hydrostatic pressure on the beam. Nonlinear deflection or buckling will occur when T exceeds the elastic limit or the tensile strength of the material. In terms of actual depth at sea and the light of some experimental evidence, the equation should be expressed as $$\text{Ocean depth in feet} = 9.30 KT\left(\frac{d}{t}\right)^2 \qquad (5b)$$

where T is in lbs./in.², and $K=1$, if Equation 5a is assumed to be correct and $K \simeq 2$ if the preliminary experimental evidence is reliable. For example, samples of the ⅜" O.D. 3S half-hard aluminum with .028" thick walls buckled under pressure 400–500 lbs./in.², corresponding to an ocean depth of about 1,000 feet. If $T = 20,000$ lbs./in.² and $K=1$, Equation 5b predicts an ocean depth of 460 feet. There are further indications that with proper design in the cross-sectional geometry of the compliant tubes buckling may be minimized or averted.

Equations 5a and 5b are significant also in that they indicate the hydrostatic pressure or ocean depth over which the compressibility due to the compliant tubes will be essentially constant and, therefore, a very definite improvement over air bubbles and celltite rubber.

The reflective characteristics of a single layer of compliant tubes are not unlike those of a uniform sheet of material, with a velocity of sound $c_n$, immersed in a fluid with velocity $c$. The ratio of the two velocities $C/c_n$ will be defined as the index of refraction $n$. The reflection coefficient of such a sheet of thickness $l$ may be calculated by analogy with electrical transmission line theory. Utilizing Equation 62, page 186, of Terman's Radio Engineer's Handbook, First Edition, and assuming that (a) the densities of the two media are the same, (b) the $\rho_c$ of the fluid is the load terminating the transmission line and (c) the characteristic impedance of the latter is $\rho_c/n$, it may be shown that frequencies where the sheet thickness $l$ is small compared to the wavelength $\lambda$ of sound in the fluid that the amplitude reflection coefficient, R, may be rewritten simply as $$R \simeq \pi/\lambda (K/S) \qquad (6a)$$

The significance of this equation may be emphasized by rewriting Equation 3 in the form $$s(n^2 - 1)d = M_0\left(\frac{\Delta V}{\Delta p}\right) \qquad (3a)$$

wherein the term on the right may be replaced by K which, essentially, is a constant at low frequencies and characteristic of a given compliant tube. If $d$ is assumed to be equal to $l$, then the amplitude reflection coefficient may be rewritten simply as $$R \simeq \pi/\lambda (K/S) \qquad (6a)$$

Thus for an array of a particular type of compliant tubing, the amplitude reflection coefficient varies inversely with the spacing at low frequencies.

Figure 5:
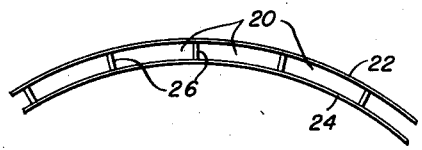
FIG. 5 illustrates a modified array of compliant tubes or chambers.

While the skeletonized configuration of the described compliant strip array is a decided advantage due to its simplicity and its great reduction of the essential mass and drag of the structure, it is possible to utilize the principles of compressibility control of this invention in a continuous structure which will provide improved control of the velocity of propagated vibrational energy in a liquid medium. A continuous structure comprising a plurality of sealed air filled resilient walled chambers 20 may be constructed, as indicated in FIG. 5, of a pair of thin spaced sheets 22, 24 of resilient material such as aluminum, steel, or the like, which are fixedly mounted in spaced relation by a plurality of spacing elements 26 welded to the facing surfaces of the sheets. The outer edges of the structure thus formed may be conveniently sealed by peripheral strips (not shown) or any other suitable means to prevent flooding and confine a gas such as air therein. The spacers 26 may be continuous to provide a plurality of common walled elongated chambers 20 or alternatively each of the spacers may be discontinuous to provide in effect one large sealed chamber or a plurality of communicating chambers throughout the extent of the continuous structure.

It will be seen that the compliant structures described above provide a simple and efficient means for controlling the compressibility of a liquid in which they are immersed to thereby effect directional control of propagated energy. The proper geometrical configuration for any of these structures will depend upon the desired application. It will be appreciated that such compliant structures may be advantageously utilized wherever an impedance discontinuity or velocity change in a liquid is required as, for example, in reflectors, lenses, soft walled resonators, the isolation of sound, and in many other applications.

With the advent of active sonar and audio frequencies, attempts to use ultra-sonic techniques have proved to be complex and expensive. The concept of designing a transducer as a sound source together with desirable directional characteristics is no longer justifiable for optimum performance and greatest convenience. However, there remains the basic fact, that whether at high or low frequencies, the sharpness of a beam is directly proportional to the dimensions of the sound source in terms of wave lengths. Several exemplary forms of beam forming sonar reflectors utilizing the compliant strip structure of this invention are shown herein. It is to be understood, however, that these are but several of the many forms of reflectors which may be built utilizing the principles of this invention and many other reflective configurations will be immediately apparent to those familiar with the art.

Figure 6B:
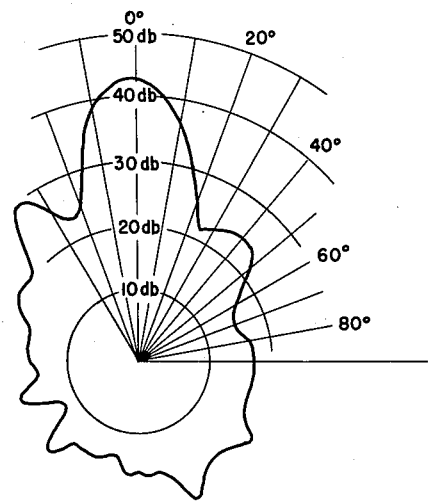
FIGS. 6 through 10 illustrate various forms of compliant reflectors and operating characteristics thereof.
Figure 6A:
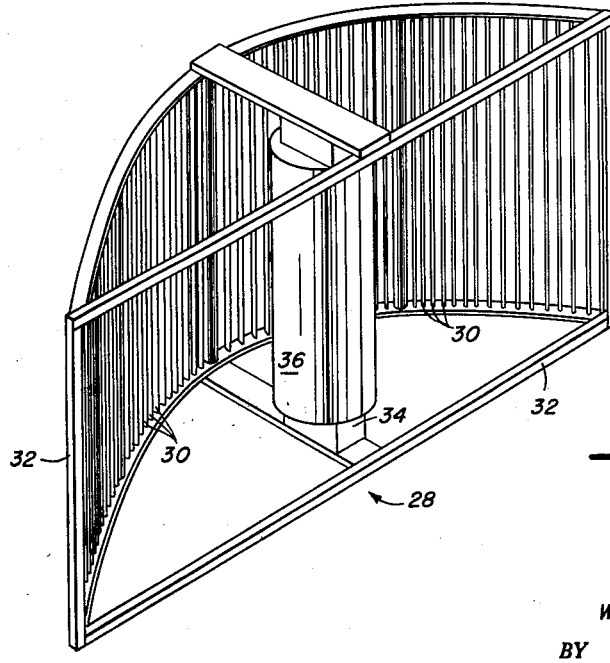

FIG. 6b shows a directivity pattern of a cylindrical parabolic reflector 28 (FIG. 6a) made of spaced complaint tubes 30, which may be either elliptical in cross-section or in the form of a flattened figure eight, fixedly mounted in a skeletal frame 32 which provides the desired configuration and has supports 34 thereon for mounting a suitable transducer 36 of well known type which may, for example, comprise a stack of barium titanate cylinders. Reflection, which is optimum when direct and reflected waves are in phase, is best when the transducer is located at an odd number of quarter wave lengths from the vertex of the reflector. This interference phenomenon will be of considerably less magnitude in a parabola of revolution where the transducer is optimumly in the form of a section of a sphere with relatively small dimensions. The elastic limit of metallic compliance tubes used in this reflector corresponds to depths of several hundred feet. The inner walls of the tube will touch each other at the center at greater depths. Down to such greater depth, efficient reflection is unaltered even though deformation takes place. Unless the limiting depth is exceeded greatly, the tubes may be expected to reflect normally when the hydrostatic pressure is reduced below the limit.

Figure 7A:
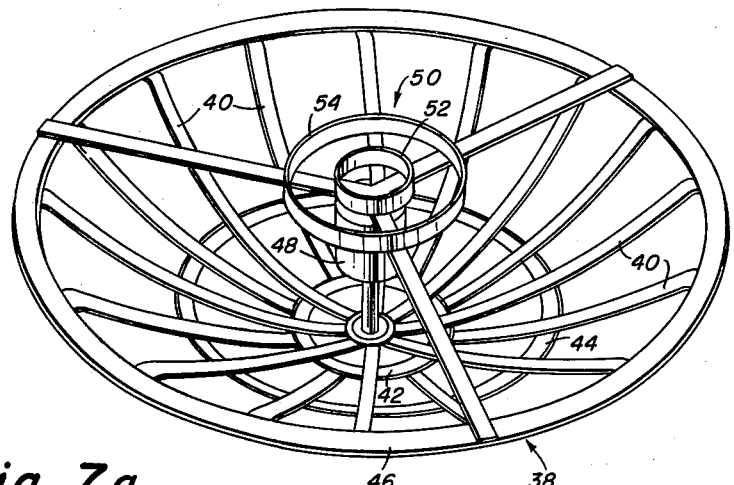

Illustrated in FIG. 7a is a compliant tube reflector 38 which is arranged to provide an approximately constant beam width over the frequency range of the reflector. The complaint tubes 40 are mounted in a parabolic configuration by means of a skeletal framework of rigid rings 42, 44, 46 and extend radially from the apex of the parabola to the periphery of the aperture (ring 46) thereof whereby the spacing between strips progressively increases from apex to aperture. A transducer 48 which may be a cylinder of barium titanate or the like is mounted at the focus of the parabola and the secondary reflector 50 formed of a pair of spaced rings 52, 54 of compliant tubing is providing, as is well known, for the purpose of suppressing and minimizing side lobes and increasing the main lobe radiated power to provide a directivity pattern as shown in FIG. 7b. As tube to tube spacing varies, the reflection from the compliant array is good up to a spacing which is equal to or less than one half wave length in water. At points where the tube to tube spacing is greater than one half wave length, reflection falls off and the size of the reflector aperture is effectively reduced. With a reflector of constant effective size, beam width will increase as frequency decreases and as wave length increases as is well known. Conversely, as reflector size decreases, the beam width will increase for any one frequency. Therefore, it will be readily appreciated that with the varying spacing of this reflector, there is provided, in effect, compensation for the increase in beam width with decrease in frequency by the effective increase in the diameter of the reflector aperture with decrease in frequency whereby a constant beam width is maintained over a wide range of frequency.

Figure 8A:
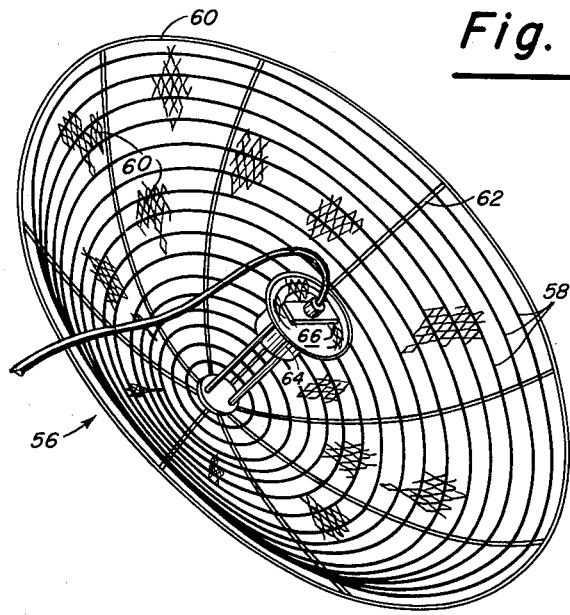
Figure 8E:
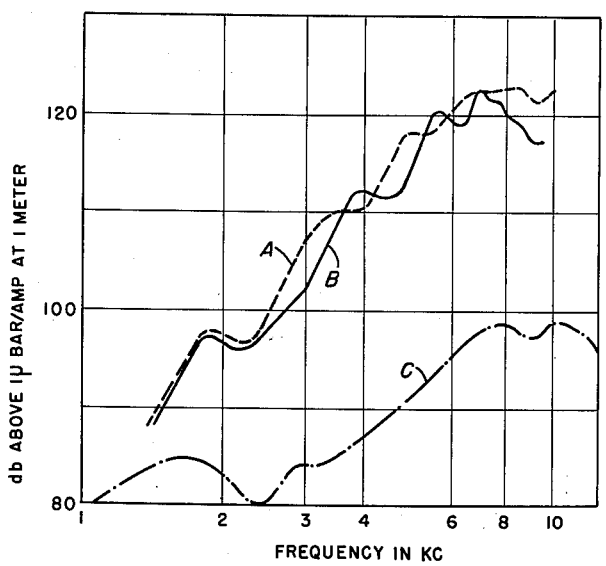

In FIG. 8a is shown a reflector 56 in the shape of a parabola of revolution which is constructed of continuous compliant strips 58 of air filled or celltite rubber which are secured to a parabolic shell conveniently made of a continuous reticulated wire fabric 60 maintained in the desired configuration by a plurality of rigid strips 62 forming a skeletal parabolic framework. A transducer 64 is mounted at or near the focus and there is provided a secondary reflector 66 similarly formed of air cell rubber strips secured to reticulated wire. Directivity patterns of this reflector at several frequencies are indicated in FIGS. 8b, c, d, while the variations of reflector response with frequency is indicated in FIG. 8e wherein curves A and B indicate respectively the response obtained with the transducer at slightly different distances from the apex of the reflector while curve C indicates the response of the transducer without the reflector. The compliant strips of this array may be conveniently cut from a sheet of relatively thin air cell or celltite rubber having air tight thin walled cavities sealed therein or it may alternatively be made of cords of such rubber, such as one quarter inch diameter celltite cords which are available from B. F. Goodrich Company of Shelton, Connecticut.

Curves A and B of FIG. 8e illustrate the basic point of preferably locating the transducer at a distance where the transmitted and reflected waves interfere constructively in order to obtain sound output from the transducer of maximum intensity at any one frequency. This interference phenomenon is much more pronounced with a cylindrical parabola and the latter configuration is therefore less desirable. While compliant tubing as illustrated in FIG. 1 is to be preferred for a permanent installation, extremely simple and inexpensive reflectors can be constructed with the air cell rubber strips where the depth of immersion is not great and usage is intermittent.

Figure 9A:
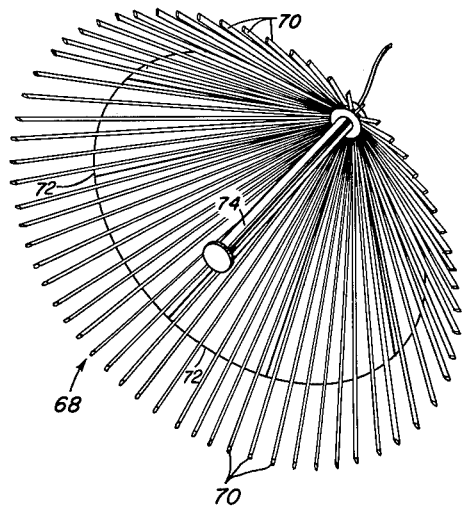

FIG. 9a illustrates the application of the principles of this invention to a right angle conical reflector 68 and several directivity patterns which may be obtained therewith. Straight lengths of compliant tubing 70 are secured to a skeletal right angle conical framework 72 and extend divergingly from the apex of the cone toward the periphery of the aperture thereof. A line hydrophone 74 such as a relatively small diameter elongated cylinder of barium titanate is mounted on the axis of the cone near the apex thereof. It will be seen that this arrangement is somewhat similar to the parabolic reflector of FIG. 7a in that the tube to tube spacing and therefore the effective size of the reflector aperture varies.

Figure 10A:
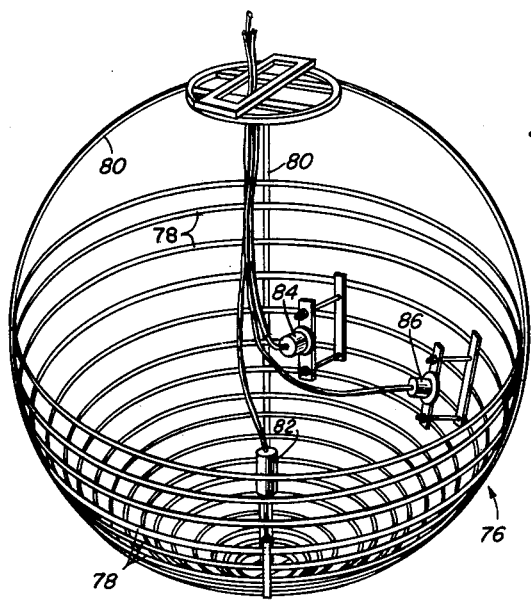
Figure 10C:
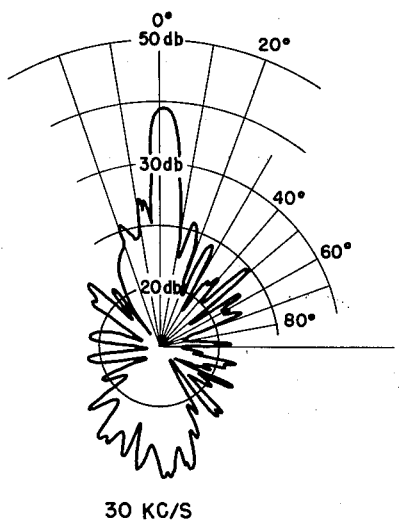
Figure 10B:
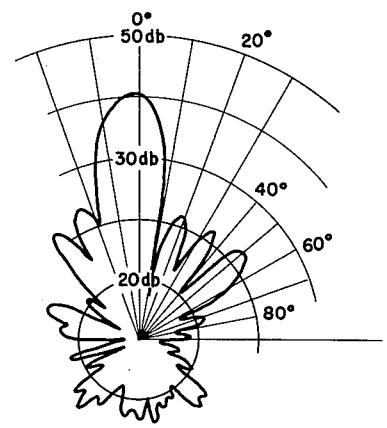

While the reflectors described above are uni-directional in that the gain in response provided thereby occurs largely along the axis of the cylindrical or parabolic configuration, the reflector 76 of FIG. 10a is unusual by reason of its multi-directional focusing properties. This reflector is of substantially hemispherical configuration and comprises a plurality of compliant tubes 78 in the form of circular rings which are of progressively increasing diameter from the apex to the aperture of the hemisphere and are fixedly mounted in this configuration by being secured to a suitable rigid skeletal framework 80. This hemispherical shell reflector is unusual because of its ability to simultaneously focus plane sound waves which are propagated from any direction within about 60° relative to the axis of the hemisphere, a line drawn through the apex thereof perpendicular to the plane of the aperture. This multi-directional focusing requires that the probe or hydrophone be offset angularly by the same amount as is the angular offset of the incident sound if the hydrophone is to be at the proper focus point within the hemispherical reflector. The drawing shows three different hydrophones or transducers positioned at different points angularly located in three dimensions relative to the axis of the shell. The successful use of a multiple focusing hemispherical reflector depends on overcoming or minimizing the inherent spherical aberration. This problem may be solved ideally by choosing a transducer which is shaped so that all the rays arriving on the aperture from a given direction arrive in phase at the transducer. However, at low frequencies or where the radius of the aperture is comparable to or several times larger than the wavelength of sound in the fluid medium, the shape of the transducer is not very critical and, therefore, a line or piston type of transducer yields satisfactory results. A line hydrophone 82 comprising a stack of barium titanate cylinders is positioned on the main axis of the shell while piston-type hydrophones 84, 86 are positioned to be offset by different angular amounts from the main axis. FIGS. 10b and c illustrate directivity patterns which may be obtained with the line hydrophone 82 of FIG. 10a, located on the main axis of the hemispherical shell at 15 and 30 kilocycles per second, while FIGS. 10d and 10e illustrate directivity patterns obtainable at frequency of 20 kilocycles per second with the piston type hydrophones 84, 86 offset 38° and 54° respectively from the main axis of the shell. It will be readily appreciated that three or more of these hemispherical reflectors, arranged back to back, may be used for full 360° coverage. The optimum focusing distance, the distance between the hydrophone and the shell will vary with the angular position and the type of hydrophone. It will be readily appreciated that the transducers illustrated and their positions are merely illustrative of many possible applications of transducers to this multi-directional reflector which will provide directional scanning without physical movement of the reflector itself. A single transducer may be mounted for movement through one or several or all of the foci whereby energy may be transduced selectively at more than one of the foci. Alternatively, a plurality of relatively fixed transducers may be mounted within the shell and manually, mechanically, or electrically scanned individually or simultaneously. Since the transducers in this arrangement as well as the transducers of each of the other reflecting and focusing arrangements will both receive energy incident upon the reflector and focused at the transducer or transmit energy which is to be sent out in a beam from the reflector, it is apparent that each of the reflectors may be utilized both for projecting and receiving sonic energy. Furthermore, it will be readily appreciated that the multiple focusing or multi-directional properties of the hemispherical reflector are not limited to a reflector made of compliant strips nor used with energy propagated through a liquid or by means of compressional waves since this hemispherical reflective configuration is equally well adapted for use with other types of energy, such as electro-magnetic radiation, when the shell is made of material which is known to be suitable for reflection of such energy.

The upper frequency limits of the reflector of FIG. 10a, and similarly of the reflectors previously described, are determined by the tube to tube spacing which is about one half wave length at the upper frequency of the band over which the reflector will operate, while the low frequency limit is determined by the overall diameter of the reflectors and by the apparent acoustic transparency. The apparent acoustic transparency is a matter of interest only in a multi-directional device where some of the useful or receivable and focused incident energy will come from a direction such that it must pass through at least a portion of the reflective shell. Maximum reflection occurs when the apparent thickness of the shell or array is one quarter wave deep in the mixture of the compliant strips and the liquid medium while the apparent thickness increases as the spacing becomes smaller and vice versa.

As may be seen from FIG. 2, each compliant tube with given dimensions and elastic constants is characterized by a relatively uniform index of refraction below its resonant frequency while above such resonant frequency, the index of refraction is large even though it does vary, whereby at the higher frequency, a relatively large, if irregular, reflection is provided. This information is of importance in distinguishing between the use of compliant strip arrays as either a lens or a reflector. For use as a lens, the major criterion is uniformity of refraction whereby frequencies below the resonant frequency of the individual tube are indicated whereas for use as a reflector the major criterion is a large magnitude of reflection, uniformity being secondary, whereby reflection is greatest for a given spacing or concentration of compliant tubes in the mixture at or above the resonant frequency. For example, the spherical lens of FIG. 4 of applicant's copending application for "Spherical Acoustical Lens System for Focusing Underwater Sound," Serial No. 441,954, filed July 7, 1954, which utilizes the compliant tubing of this invention and of which this application is a continuation in part, is optimumly operated and designed to operate below the resonant frequency of the tubing of which it is formed.

Reflectors may be used in many and varied applications which may range in frequency from 100 cycles per second to 100 kilocycles per second or more. Both shipboard and fixed installations should benefit in terms of cost, simplicity, and versatility. For example, a simple plane reflector of compliant tubing which is more than one half wave length in extent will yield a directivity index up to 7.8 decibels compared to 3.0 decibels for a hard wall reflector of similar size. In the case of focusing type reflectors, the concentration of acoustic energy will increase as the square of the frequency and should therefore tend to counteract the attenuation factor at sea which varies also as the square of the frequency. Thus, for a given geometry, low frequencies are not necessarily superior to high frequencies for long range detection if directivity is taken into consideration.

FIG. 11 illustrates a combination reflector and lens which is similar in operation to both the reflector of FIG. 10a and the spherical lens of the aforementioned co-pending application, and is herein designated as a partial transmit, partial reflect thin shell which simulates the focusing property of the spherical lens. The thin shell sphere 88 of FIG. 11 is constructed much the same as is the hemispherical shell of FIG. 10 except, of course, for the fact that the sphere is completed by additional rings 90 of compliant tubing of progressively decreasing ring diameter toward the opposite pole or apex thereof. While but a single transducer 92 is shown within the sphere, it is to be understood that any of the transducer arrangements mentioned in connection with the hemispherical reflector of FIG. 10a, such as the plural electrically scanned transducers or as a single physically scanning or movable transducer may be utilized therewith. While the hemipspherical shell is multi-directional within an angular range of plus or minus 60° from the axis thereof, it is apparent that the spherical shell is omni-directional in that it will focus energy incident upon the shell from any direction in 360 spherical degrees. The thin shell focusing sphere of FIG. 11 functions best when the tube spacing and frequency are such that half of the incident energy is allowed to penetrate through the shell and into the interior thereof. When this transmitted energy strikes the opposite wall, half is lost through the partially transparent wall but the other half (or one fourth of the original incident energy) will be focused inside the sphere at one focal point thereof of the two which lie along the line of propagation of the incident energy. The energy will be focused at the focal point of the two which is further from the source of incident energy, in a manner similar to the focusing of energy by the hemispherical shell reflector 76.

In the design of transducers for underwater sound it is essential that some form of presssure-release mechanism be provided for optimum coupling. At present, pressure release is achieved through the use of celltite rubber, corprene, and air enclosures. The ideal system is one in which pressure release is provided that is independent of hydrostatic pressure and does not age with time. None of the above mentioned materials completely fulfills these requirements. To be effective, a pressure-release material must have a specific impedance which is much lower than that of the surrounding medium. Compliant tubing appears to be more suitable pressure-release material as it permits complete free-flooding of the transducer when desired. The presence of compliant tubing does not materially alter the density of the liquid but reduces the velocity of sound by a factor equal to the index of refraction $n$. The latter may be expressed from Equations 3 and 3a as $$(n^2-1)V_0 = K(f) \qquad (3b)$$

where $K(f)$ is a constant for a given tube which varies with the frequency only, and $V_0$ is the cell or volume already defined as $S^2$ for a square lattice arrangement of tubing or $Sd$ for a single layer arrangement. Thus, to a first approximation, the index of refraction varies inversely with the center-to-center tube spacing. Consequently, a maximum index of refraction 6–10 is indicated for the tube shown in FIG. 1 when the measurements indicated in FIG. 2 are extrapolated to fit Equation 3b. If mutual coupling is taken into consideration, the predicted index of refraction may be even higher.

Figure 12:
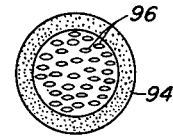
FIG. 12 illustrates the use of the compliant tubing of this invention for pressure release.
Figure 9B:
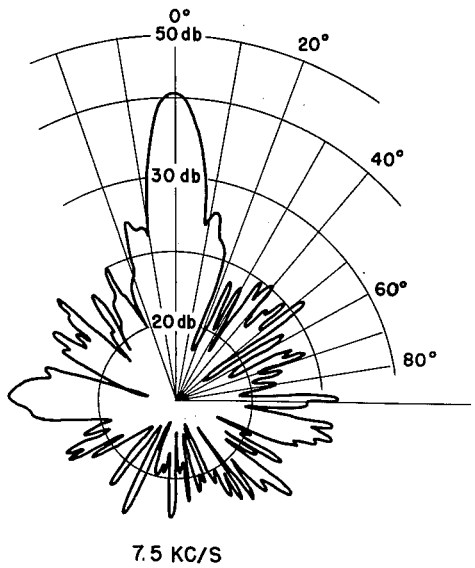
Figure 9C:
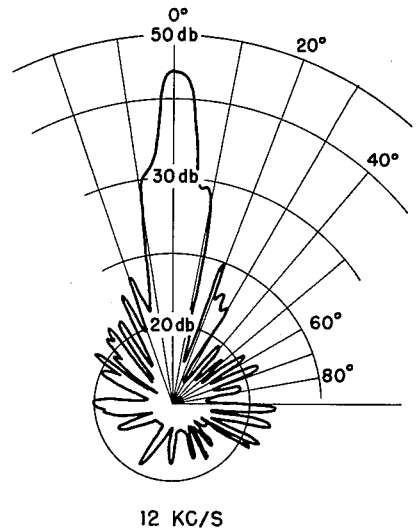

A pressure release arrangement is illustrated in FIG. 12 wherein a cylindrical barium titanate transducer 94 has the hollow interior thereof encompassing a volumetric array of elongated compliant tubes 96 which extend parallel to the axis of the cylinder and are held in place by any suitable means (not shown), such as, for example, being secured to the usual transducer mountings. The ends of the transducer may remain open since no sealing of the compliant mixture of water and tubing is necessary.

Referring now to FIG. 13, a resonant soft wall chamber may be utilized to improve the impedance match for a particular transducer whereby better coupling of the transducer with the liquid medium may be provided. The transducer 98 may be suitably mounted within a substantially continuous chamber 100 of which the walls are formed of the resilient tubing 102 of this invention and having an aperture 104 in one wall thereof facing the direction in which sound is to be transmitted in the pattern 106 shown toward a reflector 108 or with no reflector at all. In accordance with the principles set forth above, the tube to tube spacing of the chamber wall is designed for maximum reflection at a predetermined operating frequency and the chamber 100, as a whole, is dimensioned for resonance at such frequency whereby the matching of the transducer with its water load is improved. The size of the aperture is chosen to provide optimum radiated power.

In the use of dipping sonar carried underwater by aircraft, such as a helicopter, there arises the problem of undesirable effects on the receiving hydrophone due to the noise projected by the aircraft itself. As shown in FIG. 14, an umbrella like array 110 of compliant strips 114 may be arranged adjacent the dipping sonar 116 and secured to the line 118 on which it is supported from the helicopter 120 to provide reflection, as indicated by the arrows, of the helicopter produced noise away from the hydrophone whereby the latter is effectively isolated from noises created above the water surface.

Similarly, compliant tubing about the hull of a ship or in a cage about the propellers thereof, will minimize the radiation of sound into the sea. The effectiveness of this arrangement will be increased by providing well known sound absorptive material to keep the stored energy to a minimum. In a somewhat different sense, cavitation noise may be minimized or quenched by lining propellers of a ship with compliant tubing as has been done with other types of pressure release material.

Indicated in FIGS. 15a and 15b are two possible arrangements of compliant strips which will provide in a liquid medium the properties of thin lenses. A plurality of compliant tubes 122, 124 may be arranged in an overall geometrical configuration such as a flat disk 126, 128, though circular configuration is not essential, with the spacing between adjacent strips progressively increasing from the center of the array 126 toward the periphery thereof as in FIG. 15a, or with the spacing of the strips progressively decreasing from the center of the array 128 toward the periphery as in FIG. 15b. With the increasing spacing of FIG. 15a, there is provided a convex or focusing lens while with the decreasing spacing of FIG. 15b, a concave or diverging lens is provided. The compliant tubes may be either arranged in concentric circles (in a circular geometric configuration) with the space between concentric rings progressively varying toward the circumference of the circle, the strips may be arranged as straight, parallel cords of a circle, or they may be arranged as straight strips parallel to two sides of a rectangular configuration. Since the index of refraction of sound energy incident upon an array of compliant tubes varies with the tube to tube spacing, the index of refraction of such an array will vary in accordance with the distance from the center of the array whereby incident energy will be transmitted through different portions of the array in different directions and focused or diverged in accordance with the particular variation in tube to tube spacing.

As pointed out above, maximum reflection will occur where the apparent thickness of a planar layer of compliant tubes is one quarter wave length of the mixture of array and propagating medium. At lower frequencies where the thickness is less than one quarter wave length or in cases where additional reflection is desired, there may be provided a second layer of similarly spaced compliant tubes which is arranged behind the first layer, as is well known, at a distance which is one quarter wave length in the propagating medium. As many as three such layers may be utilized to provide walls of a resonant chamber to yield almost total reflection, a high Q chamber having substantially no lost energy. Such a high Q chamber, as is well known to those skilled in the art, may be utilized to measure velocity of sound in the sea at various depths when provided with suitable sound sources therein.

It will be seen that in accordance with the principles of this invention, an array of highly compliant spaced strips, when mixed with an energy propagating liquid medium, enables an efficient and simple control of the velocity of propagation of energy in such medium by means of the substantial increase in the effective compressibility of the liquid, whereby a predetermined and controlled index of refraction may be provided in a selected portion of the liquid having a preselected geometrical configuration. The compressibility of the mixture of compliant strips and propagating medium obtained with the methods of this invention is of constant value at low frequencies and substantially independent of pressure as long as the elastic limit of the material is not exceeded.

Obviously many modifications and variations of the present invention are possible in the light of the above teachings. It is therefore to be understood that within the scope of the appended claims the invention may be practiced otherwise than as specifically described.

What is claimed is:

1. An underwater sound reflector comprising a shell shaped as a parabola of revolution and having an apex and an aperture opposite said apex, said shell being formed of a plurality of elongated elements extending from said apex to the periphery of said aperture in such manner that the spacing therebetween increases toward said aperture, and said elements each including a flattened metallic thin-walled tube having a gas sealed therein, whereby the compressibility thereof is substantially greater than the compressibility of water.

2. Means for propagating acoustic energy within an aqueous medium comprising in combination a rigid skeletal frame of predetermined geometrical configuration, a plurality of thin-walled, sealed, compliant tubes mounted on said rigid skeletal frame, said compliant tubes being hollow and having a cross section containing a major axis and a minor axis, a transducer spacially disposed from said plurality of compliant tubes, and means interconnecting said rigid skeletal frame and said transducer for supporting same in said spacial disposition.

3. An underwater sound source comprising in combination, a rigid skeletal frame of predetermined geometrical configuration, a plurality of compliant tubes mounted on said rigid skeletal frame, said compliant tubes having thin resilient walls flattened to provide an elliptical cross section and having sealed ends for maintaining a hollow space therein, a transducer spacially and externally disposed from said plurality of compliant tubes, means connected to said transducer adapted to convey electrical energy thereto for excitation thereof, and means interconnecting said rigid skeletal frame and said transducer for supporting same in said spacial disposition.

4. A broadband energy projector adapted for reflection and refraction of sound waves within an aqueous medium comprising in combination a rigid skeletal frame of predetermined geometrical configuration, a transducer mounted on said rigid skeletal frame, a first plurality of hollow compliant tubes mounted on said rigid skeletal frame and spacially disposed from one side of said transducer, a second plurality of hollow complant tubes mounted on said rigid skeletal frame and spacially disposed from the side of said transducer opposite the side of the aforesaid first plurality of hollow compliant tubes, said first and second pluralities of hollow compliant tubes each having thin resilient walls, said first and second pluralities of hollow compliant tubes each having a flattened cross section with major and minor axes, said first and second plurality of hollow compliant tubes having sealed ends, said first and second pluralities of hollow compliant tubes each being resonant at any of a plurality of frequencies when excited by acoustical energy having a like plurality of frequencies within a predetermined frequency band, and electrical lead means coupled to said transducer.

5. A resonator adapted for simultaneous reduced drag movement and acoustical energy propagation through a liquid medium while being submerged therein comprising in combination, a rigid skeletal frame, a plurality of spacially disposed hollow compliant tubes mounted thereon for effecting a predetermined geometrical configuration, said hollow compliant tubes having thin resilient walls, a substantially oblong cross section having a major axis and a minor axis, and variable resonance characteristics responsive to acoustical energy excitation within a given frequency band, a transducer spacially disposed from said compliant tubes for providing said acoustical energy excitation thereto and receiving acoustical energy therefrom, and means interconnecting said rigid skeletal frame and the aforesaid transducer for supporting same in said spacial disposition.

6. An underwater sonic energy reflector comprising in combination, a plurality of compliant hollow tubes each of which has a resilient wall and an elliptical cross section defining a major axis and a minor axis thereat, said wall having portions thereof capable of resonating with substantially constant amplitude vectors in a direction normal to said major axis when vibrated by constant pressure energy within the acoustical frequency spectrum, a fluid of greater compressibility than that of water sealed within the hollow of each of said compliant tubes, and means for mounting said fluid filled compliant hollow tubes in a predetermined skeletal geometrical configuration.

7. Means for refracting acoustical energy in a liquid medium while being submerged therein comprising in combination, a plurality of compliant hollow tubes each of which has a thin resilient wall and an oblong cross section defining a major axis and a minor axis thereat, a fluid of greater compressibility than that of said liquid medium sealed within the hollow of said compliant tubes, said wall having portions thereof capable of resonating with substantially constant amplitude vectors in a direction normal to said major axis when energized by constant pressure energy within the acoustical frequency spectrum, and means for mounting said fluid filled compliant tubes in a predetermined skeletal geometrical configuration.

8. An apparatus for altering the velocity and direction of sound through a liquid propagating medium at a defined planar region while changing the bulk modulus of said liquid propagating medium in said region comprising in combination, an array of compliant, flattened, hollow, tubular elements each of which has an oblong-elliptical cross section with the sides thereof longer in one direction than in another, a fluid having a compressibility greater than that of said propagating medium sealed within each of said compliant, flattened, hollow, tubular elements, rigid frame means connected to each of said compliant, flattened, hollow, tubular elements for mounting same in a predetermined skeletal geometric configuration defining said region and in spaced relationship to provide substantially unobstructed sonic energy paths within the aforesaid liquid propagating medium between said array and a position remote therefrom while same is being moved therethrough with low drag resistance.

9. An apparatus for controlling the effective compressibility of a liquid comprising in combination, a plurality of compliant tubular members each of which has a thin resilient wall, sealed ends, and an oblong cross section defining a major axis and a minor axis thereat, a compressible gas sealed within said compliant tubular members whereby the compressibility thereof is greater than the compressibility of said liquid, means for mounting said compliant tubular members in a three-dimensional lattice configuration, and means connected to said mounting means for acoustically energizing said compliant tubular members by compressing and decompressing a portion of the walls thereof in a direction substantially parallel to the aforesaid minor axis when said lattice configuration is submerged within said liquid.

10. An apparatus for controlling the effective compressibility of a liquid while being submerged therein comprising in combination a plurality of compliant tubes each of which has a thin resilient wall, a hollow interior, and a substantially elliptical cross section, a vacuum sealed within the hollow interiors of said compliant tubes, means for supporting said compliant tubes in a predetermined skeletal lattice configuration, means connected to said supporting means spacially disposed from said compliant tubes for timely compressing and decompressing same with pressure energy vibrating within the acoustical frequency spectrum and being compressed and decompressed by pressure energy received therefrom within said acoustical frequency spectrum, and means connected to said supporting means adapted for connecting same to a carrier vehicle while submerged within the aforesaid liquid.

11. The apparatus of claim 10 wherein the thin resilient wall of each of said plurality of compliant tubes is further characterized as being of a rubber material.

12. The apparatus of claim 10 wherein the thin resilient wall of each of said plurality of compliant tubes is further characterized as being of a metallic material.

13. An apparatus for controlling the propagation of acoustical energy through a liquid medium comprising in combination, a plurality of compliant hollow tubes each of which has a thin resilient wall and an oblong cross section defining a major axis and a minor axis thereat, whereby that portion of said wall that is substantially normal to said minor axis is capable of vibration having amplitudes that exceed the amplitudes of vibration of that portion of said wall that is normal to said major axis when same are excited by acoustical energy within a predetermined frequency range, a fluid of greater compressibility than that of said liquid medium sealed within the hollow of each of said compliant hollow tubes, means for mounting said compliant hollow tubes in a spaced relationship to form a skeletal geometric configuration, and means connected to said mounting means for acoustically exciting said compliant hollow tubes within said predetermined frequency range, whereby said energy is propagated through said liquid medium due to the vibration of said compliant hollow tubes as said skeletal geometric configuration travels therethrough.

14. The apparatus of claim 13 wherein said skeletal geometric configuration is a shell forming a parabola of revolution.

15. The apparatus of claim 13 wherein said skeletal geometric configuration is a conical shell.

16. The apparatus of claim 13 wherein said skeletal geometric configuration is a hemispherical shell.

17. The apparatus of claim 13 wherein said skeletal geometric configuration is a spherical shell.

18. The apparatus of claim 13 wherein said skeletal geometric configuration is an open-lattice structure adapted to move easily through said fluid medium, whereby the drag thereon is less than that of a solid equivalent area.

References Cited in the file of this patent

UNITED STATES PATENTS

| | | |
|---|---|---|
| 1,590,689 | Hopwood | June 29, 1926 |
| 2,443,177 | Beechlyn | June 15, 1948 |
| 2,839,735 | Van Atta | June 17, 1958 |

FOREIGN PATENTS

| | | |
|---|---|---|
| 520,400 | France | Feb. 14, 1921 |

OTHER REFERENCES

Popular Science, October 1949, pp. 170–171.